United States Patent
Tanaka (10) Patent No.: US 6,927,669 B2
(45) Date of Patent: Aug. 9, 2005

(54) SECURITY SYSTEM (75) Inventor: Shinichi Tanaka, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 325 days.

(21) Appl. No.: 09/942,846

(22) Filed: Aug. 31, 2001

(65) Prior Publication Data

US 2002/0043024 A1 Apr. 18, 2002

(30) Foreign Application Priority Data

Aug. 31, 2000 (JP) ........................ 2000/262099

(51) Int. Cl.$^7$ .................. H04Q 9/00; G08C 19/00
(52) U.S. Cl. .................. 340/5.64; 340/825.69
(58) Field of Search ............. 340/5.64, 825.31, 340/825.69

(56) References Cited

U.S. PATENT DOCUMENTS

| | | | | |
|---|---|---|---|---|
| 4,737,784 A | * | 4/1988 | Hirano | 340/5.62 |
| 4,897,643 A | * | 1/1990 | Shibata et al. | 340/5.72 |
| 5,157,375 A | * | 10/1992 | Drori | 340/429 |
| 5,973,611 A | * | 10/1999 | Kulha et al. | 340/5.62 |
| 6,271,745 B1 | * | 8/2001 | Anzai et al. | 340/5.53 |
| 6,480,117 B1 | * | 11/2002 | Flick | 340/825.69 |

* cited by examiner

Primary Examiner—Michael Horabik
Assistant Examiner—Scott Au
(74) Attorney, Agent, or Firm—Wenderoth, Lind & Ponack, L.L.P.

(57) ABSTRACT

A security system, which is introduced into a vehicle or a building having one or more doors, includes a receiving circuit to receive a prescribed remote control signal, an unlocking control mechanism to make a locking mechanism or locking mechanisms to one or more doors be in the unlocked state when the prescribed remote control signal is received, a closing detecting mechanism to detect the closing of a door, and a locking control mechanism to make the unlocked locking mechanism or mechanisms be in the locked state, when the door that is opened after the door or doors are unlocked, and then the closing of the opened door is detected.

15 Claims, 8 Drawing Sheets

SECURITY SYSTEM

BACKGROUND OF THE INVENTION

1. Field of the Invention

The present invention relates to a security system and, more particularly, to a security system introduced into vehicles or buildings which have doors.

2. Description of the Relevant Art

The possibility that a private citizen may be involved in a crime or be on the scene of a crime in Japan is by no means high, but yet it cannot be concluded that a person will never encounter a crime or the scene of a crime.

Should a person be involved in a crime, or be on the scene of a crime or the like, it is advisable to leave the place immediately. For example, if the person's car is parked near the scene of the crime, it is advised that the person should leave the scene of the crime using the car, or if the person lives in the neighborhood of the scene of the crime, it is advised that the person should take shelter in their house in a hurry.

However, in order to leave the scene of the crime using a car, the steps of unlocking a door, opening the door, getting into the car, closing the door, and starting the engine, must be performed, so that it takes the person a long time to start the car. In the case where, unfortunately, the person is being chased by a criminal, even if the person can get into the car, there is a fear that the criminal may catch up and open the door so as to place the person in danger, while he/she is long starting the engine and the like.

Therefore, when leaving the scene of a crime using a car, it is desired that a person should be able to close and lock the door as soon as the person gets into the car, so that the door cannot be opened even if the criminal catches up to the person.

However, in a situation where the person is being chased by a criminal, it is fully possible that the person may lose a cool judgment and be upset, thereby forgetting to lock the door.

On the other hand, when taking shelter in a house, the steps of unlocking a door, opening the door, going into the house, closing the door, and locking the door need to be performed. In this case, similar to the case of leaving the scene of a crime using a car, it is fully possible that the person may forget to lock the door.

SUMMARY OF THE INVENTION

The present invention was accomplished in order to solve the above problem, and it is an object of the present invention to provide a security system, wherein the safety in an emergency travel using a vehicle such as a car, or an emergency evacuation into a building such as a house is heightened.

In order to achieve the above object, a security system (1) according to the present invention is characterized by being a security system introduced into a vehicle or a building having one or more doors, comprising a receiving means to receive a prescribed remote control signal and/or a capturing means to capture an emergency signal, a first unlocking control means to make a locking mechanism or locking mechanisms to one or more doors be in the unlocked state when the receiving means receives the prescribed remote control signal or the capturing means captures the emergency signal, a first closing detecting means to detect the closing of a door, and a first locking control means to make the unlocked locking mechanism or mechanisms be in the locked state, when the door is opened after the door or doors are unlocked by the first unlocking control means, and then the closing of the opened door is detected by the first closing detecting means.

Using the above security system (1), when a prescribed remote control signal is received or an emergency signal is captured, the locking mechanisms to the doors of a vehicle (e.g. a car) or a building (e.g. a house) are controlled to be in the unlocked state. Since the user can unlock the doors of the vehicle or the like beforehand by remotely controlling or touching an emergency button (e.g. a hidden button mounted in a car) whereby the emergency signal is output, the user can open a door and enter the vehicle or the like as soon as the user reaches the place where the vehicle or the like is situated.

In addition, when the closing of a door is detected, the locking mechanisms in the unlocked state are rendered in the locked state. As a result, when the user closes the door, all of the doors are locked.

Accordingly, even when the user loses a cool judgment and is upset in a situation where the user is being chased by a criminal, it is possible to avoid the occurrence of a hazardous condition where a door is opened by the criminal, if the user can only enter the vehicle or building and close the door.

A security system (2) according to the present invention is characterized by being a security system introduced into a vehicle or a building having at least two or more doors, comprising a receiving means to receive a prescribed remote control signal and/or a capturing means to capture an emergency signal, a second unlocking control means to make locking mechanisms to at least two or more doors be in the unlocked state when the receiving means receives the prescribed remote control signal or the capturing means captures the emergency signal, a first opening detecting means to detect the opening of a door, and a second locking control means to make the locking mechanisms to the closed doors be in the locked state, when the opening of the door is detected by the first opening detecting means after the doors are unlocked by the second unlocking control means.

A security system (3) according to the present invention is characterized by comprising a first closing detecting means to detect the closing of a door, and a third locking control means to make the locking mechanism to the door, the closing of which is detected, be in the locked state, when the door is opened after the doors are unlocked by the second unlocking control means, and then the closing of the opened door is detected by the first closing detecting means in the security system (2).

A security system (4) according to the present invention is characterized by being a security system introduced into a vehicle or a building having one or more doors, comprising a receiving means to receive a prescribed remote control signal and/or a capturing means to capture an emergency signal, a first unlocking control means to make a locking mechanism or locking mechanisms to one or more doors be in the unlocked state when the receiving means receives the prescribed remote control signal or the capturing means captures the emergency signal, a first opening detecting means to detect the opening of a door, and a fourth locking control means to make the unlocked locking mechanism or mechanisms be in the locked state, when the opening of the door is detected by the first opening detecting means after the door or doors are unlocked by the first unlocking control means, wherein the locking mechanism or mechanisms are self-locking mechanisms.

Using any of the above security systems (2)–(4), when a prescribed remote control signal is received or an emergency signal is captured, the locking mechanisms to the doors of a vehicle or a building are rendered in the unlocked state. Since the user can unlock the doors of the vehicle or the like beforehand by remotely controlling or touching an emergency button whereby the emergency signal is output, the user can open an appropriate door and enter the vehicle or the like as soon as the user reaches the place where the vehicle or the like is situated.

In the above security system (2) or (3), the locking mechanisms to at least two or more doors are rendered in the unlocked state. In the above security system (4), when the locking mechanisms to two or more doors, for example, the locking mechanisms to the driver's seat side door and the assistant driver's seat side door in a car are rendered in the unlocked state, the user can get into the car from either left or right side of the car, so that the user can make an entry appropriate for the situation. When the user is near the left side of the car (a right-hand drive), the user can get into the car swiftly from the assistant driver's seat side without taking the trouble to go around to the driver's seat side.

When the locking mechanisms to two or more doors are in the unlocked state, there is a chance of a criminal's breaking into the vehicle or building from another door which is not opened by the user. But using the above security system (2) or (3), when the opening of a door is detected, the locking mechanisms to the closed doors (the doors except the opened door) are rendered in the locked state. When the user opens a door, all of the doors except the door are locked. Therefore, it is possible to avoid the occurrence of a perilous condition where a criminal breaks into the vehicle or building from another door which is not opened by the user.

Moreover, using the above security system (3), when the closing of a door is detected, the locking mechanism to the door the closing of which is detected is rendered in the locked state. As a result, the door opened by the user is locked as it is closed, and all of the doors are finally locked.

Using the above security system (4), when the opening of a door is detected, the locking mechanisms in the unlocked state are rendered in the locked state. Therefore, when the user opens a door, the other doors (the doors which are not opened by the user) are locked, while the door opened by the user is automatically locked as it is closed. This is because the locking mechanism is a self-locking mechanism whereby a door is automatically locked as it is closed with an interior door lock button pushed down (with the locking mechanism kept in the locked state).

Accordingly, using any of the above security systems (2)–(4), even when the user loses a cool judgment and is upset in a situation where the user is being chased by a criminal, it is possible to avoid the occurrence of a hazardous condition where a door is opened by the criminal, if the user can only enter the vehicle or building and close the door.

A security system (5) according to the present invention is characterized by being a security system introduced into a vehicle or a building having at least two or more doors, comprising a receiving means to receive a prescribed remote control signal and/or a capturing means to capture an emergency signal, a third unlocking control means to make a locking mechanism to a prescribed door be in the unlocked state when the receiving means receives the prescribed remote control signal or the capturing means captures the emergency signal, a second closing detecting means to detect the closing of the prescribed door, and a fifth locking control means to make the locking mechanism to the prescribed door be in the locked state, when the prescribed door is opened after being unlocked by the third unlocking control means, and then the closing of the opened prescribed door is detected by the second closing detecting means.

A security system (6) according to the present invention is characterized by being a security system introduced into a vehicle or a building having at least two or more doors, comprising a receiving means to receive a prescribed remote control signal and/or a capturing means to capture an emergency signal, a third unlocking control means to make a locking mechanism to a prescribed door be in the unlocked state when the receiving means receives the prescribed remote control signal or the capturing means captures the emergency signal, a second opening detecting means to detect the opening of the prescribed door, and a sixth locking control means to make the locking mechanism to the prescribed door be in the locked state, when the opening of the prescribed door is detected by the second opening detecting means after the prescribed door is unlocked by the third unlocking control means, wherein the locking mechanism to the prescribed door is a self-locking mechanism.

Using the above security system (5) or (6), when a prescribed remote control signal is received or an emergency signal is captured, a locking mechanism to a prescribed door (e.g. the driver's seat side door) among the doors which a vehicle or a building has is rendered in the unlocked state. Since the user can unlock the prescribed door beforehand by remotely controlling or touching an emergency button whereby the emergency signal is output, the user can open the prescribed door and enter the vehicle or the like as soon as the user reaches the place where the vehicle or the like is situated.

Since only the prescribed door is unlocked, while the other doors are not unlocked, it is possible to avoid the occurrence of a perilous condition where a criminal breaks into the car, for example, from any of the doors except the driver's seat side door (such as the assistant driver's seat side door).

Moreover, using the above security system (5), when the closing of the prescribed door is detected, the locking mechanism to the prescribed door is rendered in the locked state. As a result, when the user closes the prescribed door, the prescribed door is locked.

Using the above security system (6), when the opening of the prescribed door is detected, the locking mechanism to the prescribed door is controlled to be in the locked state. Therefore, as the user opens and then closes the prescribed door, the prescribed door is automatically locked. This is because the locking mechanism to the prescribed door is a self-locking mechanism whereby a door is automatically locked as it is closed with an interior door lock button pushed down (with the locking mechanism kept in the locked slate).

Accordingly, using the security system (5) or (6), even when the user loses a cool judgment and is upset in a situation where the user is being chased by a criminal, it is possible to avoid the occurrence of a hazardous condition where a door is opened by the criminal, if the user can only enter the vehicle or building and close the door.

A security system (7) according to the present invention is characterized by being a security system introduced into a vehicle or a building having at least two or more doors, comprising a receiving means to receive a prescribed remote control signal and/or a capturing means to capture an emergency signal, a second unlocking control means to make locking mechanisms to at least two or more doors be in the unlocked state when the receiving means receives the prescribed remote control signal or the capturing means captures the emergency signal, a first closing detecting means to detect the closing of a door, and a seventh locking control means to make the locking mechanism to the door the closing of which is detected be in the locked state, when the door is opened after the doors are unlocked by the second unlocking control means, and then the closing of the opened door is detected by the first closing detecting means.

A security system (8) according to the present invention is characterized by being a security system introduced into a vehicle or a building having at least two or more doors, comprising a receiving means to receive a prescribed remote control signal and/or a capturing means to capture an emergency signal, a second unlocking control means to make locking mechanisms to at least two or more doors be in the unlocked state when the receiving means receives the prescribed remote control signal or the capturing means captures the emergency signal, a first opening detecting means to detect the opening of a door, and an eighth locking control means to make the locking mechanism to the door the opening of which is detected be in the locked state, when the opening of the door is detected by the first opening detecting means after the doors are unlocked by the second unlocking control means, wherein the locking mechanisms are self-locking mechanisms.

A security system (9) according to the present invention is characterized by comprising a second closing detecting means to detect the closing of a prescribed door, and a ninth locking control means to make the locking mechanisms to the closed doors be in the locked state, when the prescribed door is opened after the doors are unlocked by the second unlocking control means, and then the closing of the opened prescribed door is detected by the second closing detecting means in the security system (7) or (8).

Using any of the above security systems (7)–(9), when a prescribed remote control signal is received or an emergency signal is captured, the locking mechanisms to the doors of a vehicle or a building are rendered in the unlocked state. Since the user can unlock the doors of the vehicle or the like beforehand by remotely controlling or touching an emergency button whereby the emergency signal is output, the user can open a door and enter the vehicle or the like as soon as the user reaches the place where the vehicle or the like is situated.

And using any of the above security systems (1)–(6), when one door is opened and closed, all of the doors are locked, or when one door is opened, the other doors are locked, so that it is possible to prevent anyone but the user (e.g. a criminal) from breaking into a vehicle or the like.

However, when it is not the user alone but two or more persons together who try to run away from a criminal, and each of them tries to enter a vehicle or the like from a separate door, there is a possibility that one of them cannot open a door to enter the vehicle or the like, because one's opening or closing of his/her door is not timed to the others', so that the door which he/she tries to open might have been already locked.

Using the above security system (7), when the closing of a door is detected, only the locking mechanism to the door, the closing of which is detected, is rendered in the locked state. When the user or a person running away with the user closes a door, only the door is locked. Therefore, even if not one person but two or more persons try to run away together from a criminal, each one can open a door and enter the vehicle or the like swiftly.

Using the above security system (8), when the opening of a door is detected, only the locking mechanism to the opened door is rendered in the locked state. The door opened by the user or a person running away with the user is automatically locked as it is closed. This is because the locking mechanism is a self-locking mechanism whereby a door is automatically locked as it is closed with an interior door lock button pushed down (with the locking mechanism kept in the locked state).

Since the doors which are not opened can be freely opened, each person can open a door and enter the vehicle or the like swiftly, even if not one person but two or more persons run away together from a criminal.

When the opening and closing can be performed on all of the unlocked doors, all of the doors are locked, resulting in no particular problem. However, when the opening and closing cannot be performed on only one of the unlocked doors, the door, standing in the unlocked state, causes a fear that a criminal may break into the vehicle or building from the door.

Using the above security system (9), when the closing of a prescribed door (e.g. the driver's seat side door) is detected, the locking mechanisms to the closed doors are rendered in the locked state. As a result, even if the opening and closing is not performed on all of the unlocked doors, all of the doors can be locked, so that it is possible to avoid the above problem from arising.

A security system (10) according to the present invention is characterized by being a security system introduced into a vehicle or a building having one or more doors, comprising a first closing detecting means to detect the closing of a door, a receiving means to receive a prescribed remote control signal and/or a capturing means to capture an emergency signal, and a tenth locking control means to make an unlocked locking mechanism or unlocked locking mechanisms be in the locked state, when the closing of the door is detected by the first closing detecting means after the receiving means receives the prescribed remote control signal or the capturing means captures the emergency signal.

Using the above security system (10), when the closing of a door is detected, after a prescribed remote control signal is received or an emergency signal is captured, the locking mechanism or mechanisms in the unlocked state are rendered in the locked state. Therefore, when the user closes a door, all of the doors are locked.

If the user can only enter a vehicle or a building and close the door after remotely controlling or touching an emergency button whereby the emergency signal is output, it is possible to avoid the occurrence of a hazardous condition where a door is opened by a criminal.

A security system (11) according to the present invention is characterized by being a security system introduced into a car, comprising a first actuation control means to actuate prescribed functions when the receiving means receives the prescribed remote control signal or the capturing means captures the emergency signal, wherein the prescribed functions include at least one among a window closing function, an engine starting function, a call function to an emergency organization such as the police, an alarm sound generating function using a horn or the like, a hazard warning signal flasher flashing function, and a lighting/flashing function of prescribed lamps in any of the above security systems (1)–(10).

A security system (12) according to the present invention is characterized by being a security system introduced into a car, comprising a receiving means to receive a prescribed remote control signal and/or a capturing means to capture an emergency signal, a first unlocking control means to make a locking mechanism or locking mechanisms to one or more doors be in the unlocked state when the receiving means receives the prescribed remote control signal or the capturing means captures the emergency signal, a first closing detecting means to detect the closing of a door, and a second actuation control means to actuate prescribed functions, when the door is opened after the doors are unlocked by the first unlocking control means, and then the closing of the opened door is detected by the first closing detecting means, wherein the prescribed functions include at least one among a door lock locking function to make locking mechanisms to doors in the locked state, a window closing function, an engine starting function, a call function to an emergency organization such as the police, an alarm sound generating function using a horn or the like, a hazard warning signal flasher flashing function, and a lighting/flashing function of prescribed lamps.

A security system (13) according to the present invention is characterized by the prescribed lamps, including at least one among a head lamp, a tail lamp, a front fog lamp, a rear fog lamp, a dome lamp, and a map lamp in the security system (11) or (12).

Using the above security system (11), when the prescribed remote control signal is received by the receiving means or the emergency signal is captured by the capturing means, at least one function among the window closing function, the engine starting function, the alarm sound generating function using a horn or the like, the call function to an emergency organization such as the police, the hazard warning signal flasher flashing function, and the lighting/flashing function of prescribed lamps is actuated, so that a system having further heightened safety can be realized.

For example, when a window is kept open, there is a fear that a criminal may put his hand into the car and unlock the door. But, if the window closing function is actuated, the above problem can be solved.

If the engine starting function is actuated, it is possible to start a car as soon as the user enters the car. And if the call function to an emergency organization such as the police is actuated, it is possible to inform the emergency organization immediately.

If the alarm sound generating function, the hazard warning signal flasher flashing function, or the lighting/flashing function of prescribed lamps (such as head lamps or tail lamps) is actuated, it is possible to let those around the car know that the user is involved in a crime (or the user is on the point of being involved in a crime).

Using the above security system (12), when a prescribed remote control signal is received or an emergency signal is captured, the locking mechanisms to the doors are rendered in the unlocked state. Since the user can unlock the doors of the car by remotely controlling or touching an emergency button whereby the emergency signal is output, the user can open a door and get into the car as soon as the user reaches the parking place of the car.

Moreover, when the closing of a door is detected, at least one function among the door lock locking function to make locking mechanisms to doors be in the locked state, the window closing function, the engine starting function, the alarm sound generating function using a horn or the like, the call function to an emergency organization such as the police, the hazard warning signal flasher flashing function, and the lighting/flashing function of prescribed lamps (such as head lamps or tail lamps) is actuated. For example, in the case where the door lock locking function is actuated as the closing of a door is detected, all of the doors are locked as the user closes the door.

Accordingly, even if the user loses a cool judgment and is upset in a situation where the user is being chased by a criminal, it is possible to avoid the occurrence of a hazardous condition wherein a door is opened by the criminal, if the user can only enter the vehicle or building and close the door.

DETAILED DESCRIPTION OF THE PREFERRED EMBODIMENS

Figure 1:
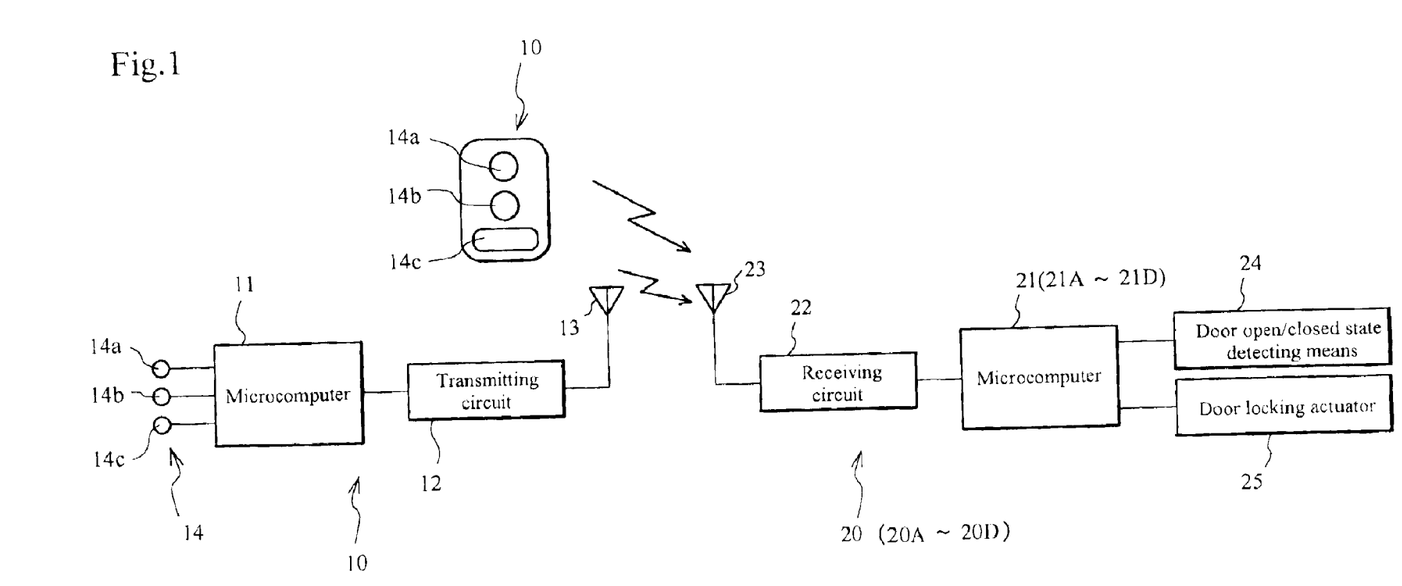
FIG. 1 is a block diagram schematically showing the principal part of a security system according to a first embodiment of the present invention.

The preferred embodiments of the security system according to the present invention are described below by reference to those Figures. FIG. 1 is a block diagram schematically showing the principal part of a security system according to a first embodiment, which comprises a portable transmitter 10 and an in-car control unit 20 mounted in a car.

The transmitter 10 comprises a microcomputer 11, a transmitting circuit 12, an antenna 13, and a switch assemblage 14. The switch assemblage 14 comprises a locking SW 14a and an unlocking SW 14b for the user's operation in controlling the locking/unlocking of doors of a car, and an emergency SW 14c for the user's operation in emergency.

The locking SW 14a, unlocking SW 14b, and emergency SW 14c are connected to input terminals of the microcomputer 11. When any of the locking SW 14a, unlocking SW 14b, and emergency SW 14c is pressed, the microcomputer 11 captures a command code corresponding to each switch (a locking command code, an unlocking command code, and an emergency command code) from the ROM (not shown) within the microcomputer 11, and transmits a signal of an ID code plus the command code through the transmitting circuit 12 and the antenna 13 to the in-car control unit 20.

The in-car control unit 20 comprises a microcomputer 21, a receiving circuit 22, an antenna 23, a door open/closed state detecting means 24 to detect the open or closed state of doors, and a door locking actuator 25 to make locking mechanisms to doors be in the unlocked or locked state.

The microcomputer 21 mounted in the in-car control unit 20 judges whether or not the ID code included in the signal (an ID code+a locking command code, an ID code+an unlocking command code, or an ID code+an emergency command code) received through the antenna 23 and the receiving circuit 22 is identical to the ID code previously stored in the ROM (not shown) within the microcomputer 21, and when they are the same, a processing according to each command code included in the signal is performed.

For example, when a locking command code is included in the signal, the door locking actuator 25 is controlled so that the door locking mechanisms become in the locked state. On the other hand, when an unlocking command code is included in the signal, the door locking actuator 25 is controlled so that the door locking mechanisms become in the unlocked state.

Figure 2:
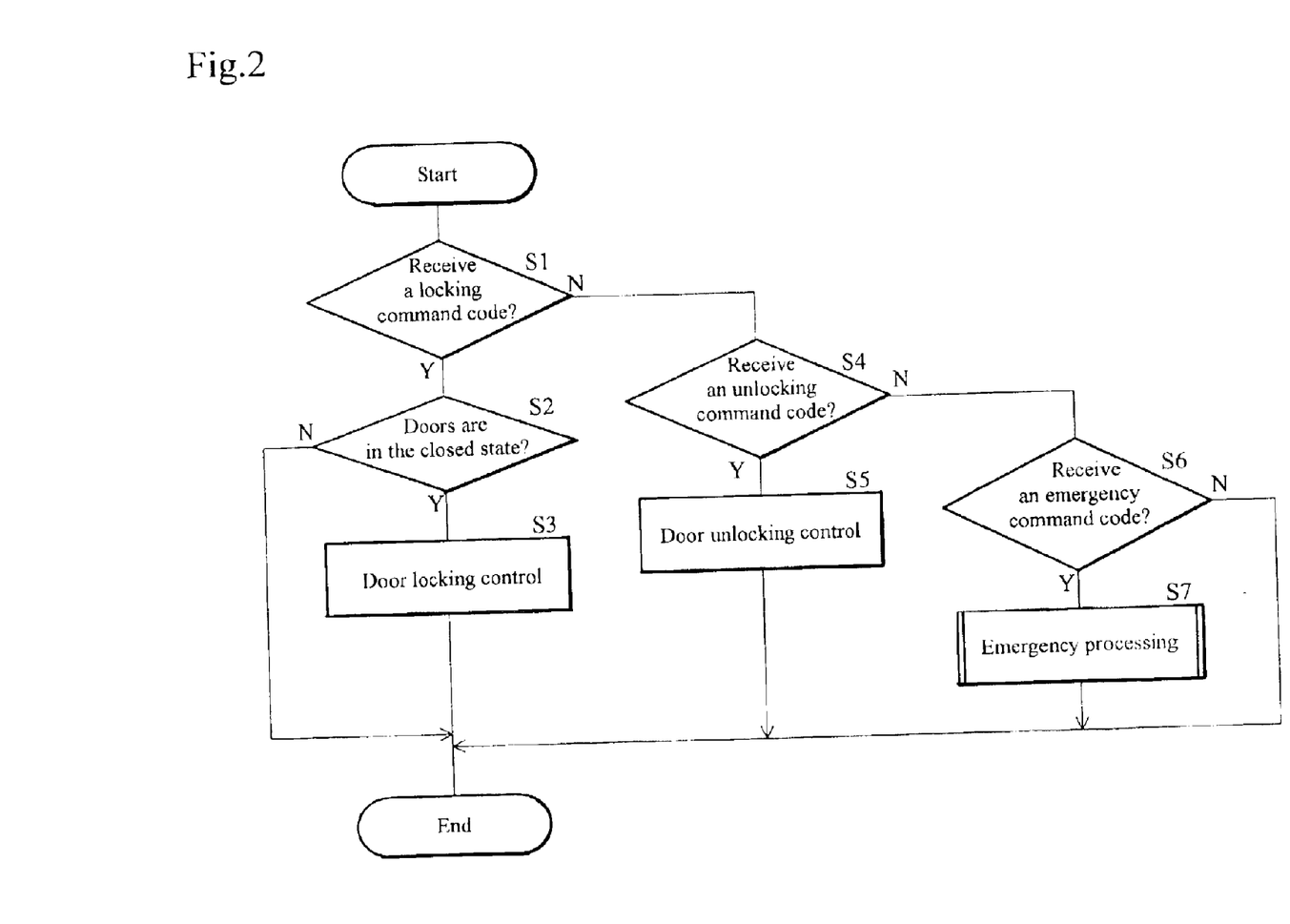
FIG. 2 is a flow chart showing a processing operation performed by a microcomputer of an in-car control unit in the security system according to the first embodiment.

The processing operation ① performed by the microcomputer 21 of the in-car control unit 20 in the security system according to the first embodiment is described by reference to a flow chart shown in FIG. 2.

Whether a signal of "an ID code+a locking command code" transmitted from the transmitter 10 is received or not is judged (Step 1), and when it is judged that the signal is received, whether the doors are in the closed state or not is judged based on an output signal from the door open/closed state detecting means 24 (Step 2).

When the doors are judged to be in the closed state, the door locking actuator 25 is controlled so that the door locking mechanisms become in the locked state (Step 3). On the other hand, when the doors are not judged to be in the closed state, the processing operation ① is ended.

When it is judged that the signal of "an ID code+a locking command code" is not received in Step 1, whether a signal of "an ID code+an unlocking command code" transmitted from the transmitter 10 is received or not is judged (Step 4). When it is judged that the signal is received, the door locking actuator 25 is controlled so that the door locking mechanisms become in the unlocked state (Step 5).

On the other hand, when it is judged that the signal is not received, whether a signal of "an ID code+an emergency command code" transmitted from the transmitter 10 is received or not is judged (Step 6). When it is judged that the signal is received, the below-described emergency processing operation is performed (Step 7). On the other hand, when it is judged that the signal is not received, the processing operation ‡@ is ended.

Figure 3:
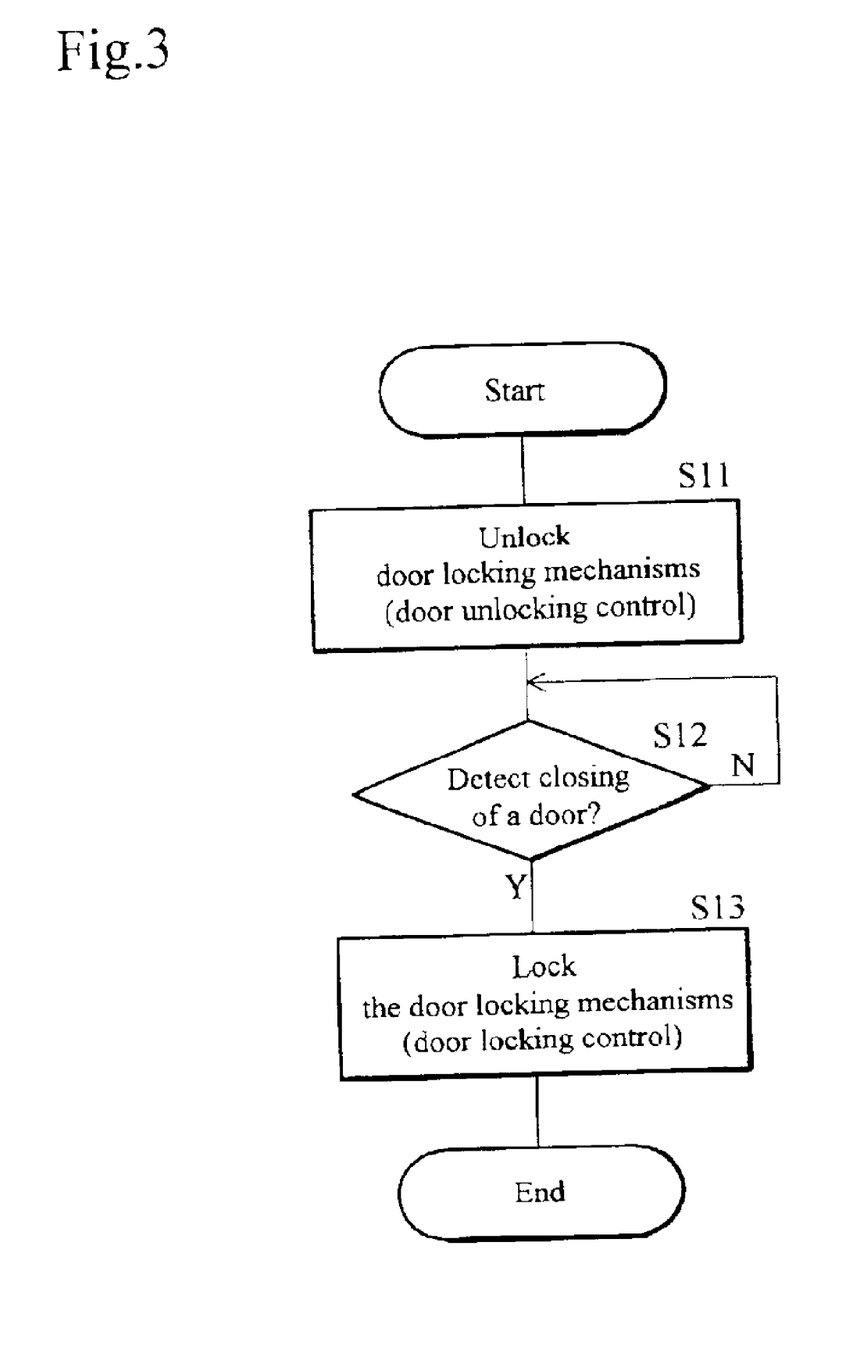
FIG. 3 is a flow chart showing a processing operation performed by the microcomputer of the in-car control unit in the security system according to the first embodiment.

The emergency processing operation performed by the microcomputer 21 is described by reference to a flow chart shown in FIG. 3. The door locking actuator 25 is controlled so that locking mechanisms to at least two or more doors become in the unlocked state (Step 11), and then, whether or not a door was opened and the opened door (the door opened by the user) is closed is judged (Step 12).

When it is judged that the door is closed (the user got into the car and closed the door), the door locking actuator 25 is controlled so that the door locking mechanisms in the unlocked state become in the locked state (Step 13). On the other hand, when it is judged that the door is not closed, the operation returns to Step 12.

Using the security system according to the first embodiment, when an emergency command code is received in the in-car control unit 20, the locking mechanisms to the doors of the car are controlled to be in the unlocked state. Since the user can unlock the doors of the car beforehand by pressing the emergency SW 14c, the user can open a door and get into the car as soon as the user reaches the parking place of the car.

When the emergency command code is received, the locking mechanisms to at least two or more doors are rendered in the unlocked state. Therefore, for example, when the locking mechanisms to the driver's seat side door and the assistant driver's seat side door are rendered in the unlocked state, the user can get into the car from either the left or the right side of the car, so that the user can make an entry appropriate for the situation. When the user is near the left side of the car (a right-hand drive), the user can get into the car swiftly from the assistant driver's seat side without taking the trouble to go around to the driver's seat side.

Moreover, when the closing of a door is detected, the door locking mechanisms in the unlocked state are rendered in the locked state. Therefore, when the user closes the door, all of the doors are locked.

Accordingly, even when the user loses a cool judgment and is upset in a situation where the user is being chased by a criminal, it is possible to avoid the occurrence of a hazardous condition where a door is opened by the criminal, if the user can only enter the car and close the door.

In the security system according to the first embodiment, when the user presses the emergency SW 14c, the locking mechanisms to at least two or more doors are rendered in the unlocked state. But in a security system according to another embodiment, only one door may be unlocked. In this case, since the locks to the doors except the door concerned (e.g. the driver's seat side door) are not unlocked, it is possible to avoid the occurrence of a perilous condition where a criminal breaks into the car, for example, from any of the doors except the driver's seat side door (such as the assistant driver's seat side door).

A security system according to a second embodiment is described below. Here, since the construction of the security system according to the second embodiment is the same as that of the security system shown in FIG. 1 except for the microcomputer, a microcomputer and an in-car control unit having the microcomputer, to which other marks are affixed, are described, while the other components are not described.

In the figure, reference numeral 20A represents an in-car control unit, which comprises a microcomputer 21A, a receiving circuit 22, an antenna 23, a door open/closed state detecting means 24 to detect the open or closed state of doors, and a door locking actuator 25 to make door locking mechanisms be in the unlocked or locked state.

The processing operation performed by the microcomputer 21A of the in-car control unit 20A in the security system according to the second embodiment is described below. Here, since the processing operation performed by the microcomputer 21A is the same as the processing operation ① shown in FIG. 2 except for the emergency processing operation (see FIG. 3), only the emergency processing operation is described by reference to a flow chart shown in FIG. 4.

Figure 4:
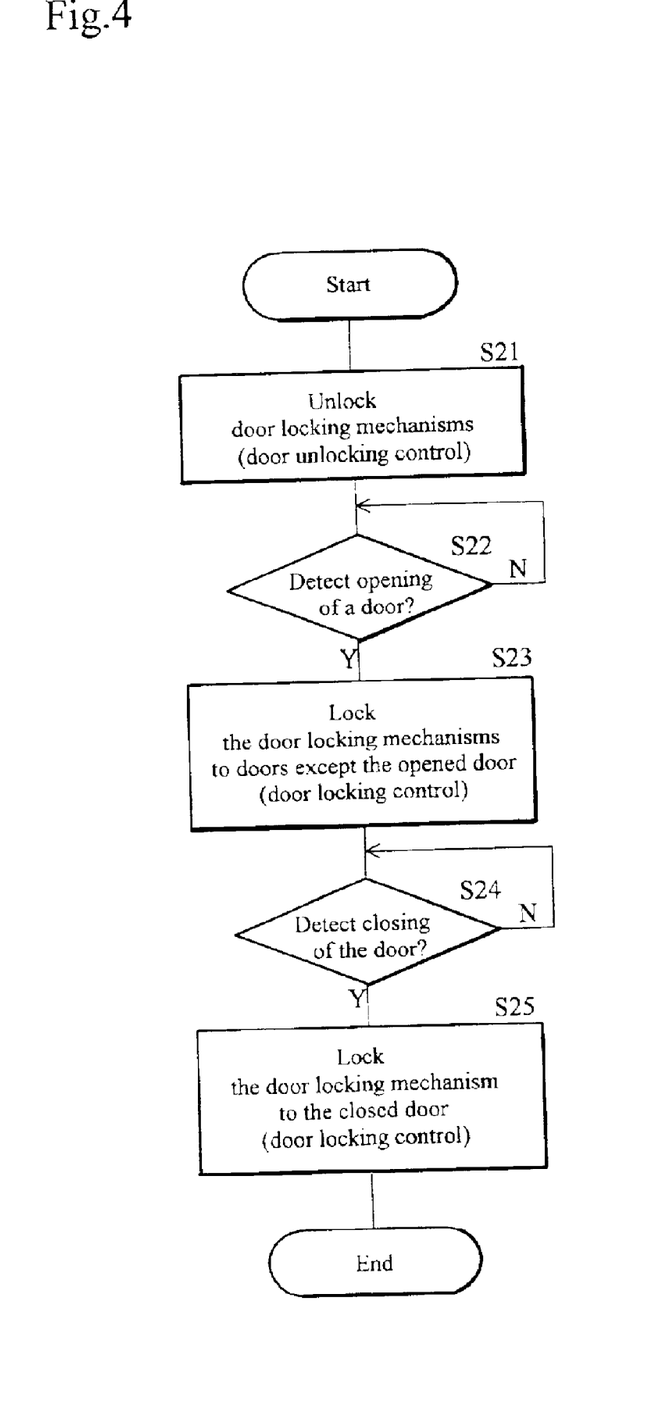
FIG. 4 is a flow chart showing a processing operation performed by a microcomputer of an in-car control unit in a security system according to a second embodiment.

The door locking actuator 25 is controlled so that locking mechanisms to at least two or more doors become in the unlocked state (Step 21), and then, whether a door is opened or not is judged based on an output signal from the door open/closed state detecting means 24 (Step 22).

When it is judged that a door is opened (the user opened the door), the door locking actuator 25 is controlled so that the locking mechanisms to the closed doors (the doors except the opened door) become in the locked state (Step 23). On the other hand, when it is judged that a door is not opened, the operation returns to Step 22.

Whether the opened door is closed or not is judged based on an output from the door open/closed state detecting means 24 (Step 24), and when it is judged that the door is closed (the user got into the car and closed the door), the door locking actuator 25 is controlled so that the locking mechanism to the door the closing of which is detected becomes in the locked state (Step 25). On the other hand, when it is judged that the door is not closed, the operation returns to Step 24.

Using the security system according to the second embodiment, when an emergency command code is received in the in-car control unit 20A, the locking mechanisms to the doors of the car are controlled to be in the unlocked state. Since the user can unlock the doors of the car beforehand by pressing the emergency SW 14c, the user can open an appropriate door and get into the car as soon as the user reaches the parking place of the car.

When the emergency command code is received, the locking mechanisms to at least two or more doors are rendered in the unlocked state. Therefore, for example, when the locking mechanisms to the driver's seat side door and the assistant driver's seat side door are rendered in the unlocked state, the user can get into the car from either the left or the right side of the car, so that the user can make an entry appropriate for the situation. When the user is near the left side of the car (a right-hand drive), the user can get into the car swiftly from the assistant driver's seat side without taking the trouble to go around to the driver's seat side.

When the locking mechanisms to two or more doors are in the unlocked state, there is a fear that a criminal may break into a vehicle or the like from another door which the user does not open. But using the security system according to the second embodiment, when the opening of a door is detected, the locking mechanisms to the closed doors are rendered in the locked state. Therefore, when the user opens a door, the other doors are locked. As a result, it is possible to avoid the occurrence of a perilous condition where a criminal breaks into the vehicle or the like from another door which the user does not open.

Moreover, when the closing of the door the opening of which was once detected is detected, the locking mechanism to the door the closing of which is detected is rendered in the locked state, so that when the door opened by the user is closed, it is automatically locked.

Accordingly, even when the user loses a cool judgment and is upset in a situation where the user is being chased by a criminal, it is possible to avoid the occurrence of a hazardous condition where a door is opened by the criminal, if the user can only enter the vehicle or the like and close the door.

A security system according to a third embodiment is described below. Here, since the construction of the security system according to the third embodiment is the same as that of the security system shown in FIG. 1 except for the microcomputer, a microcomputer and an in-car control unit having the microcomputer, to which other marks are affixed, are described, while the other components are not described.

In the figure, reference numeral 20B represents an in-car control unit, which comprises a microcomputer 21B, a receiving circuit 22, an antenna 23, a door open/closed state detecting means 24 to detect the open or closed state of doors, and a door locking actuator 25 to make door locking mechanisms be in the unlocked or locked state. Here, the door locking mechanisms are self-locking mechanisms whereby a door is automatically locked as it is closed with an interior door lock button pushed down (with the door locking mechanism kept in the locked state).

The processing operation performed by the microcomputer 21B of the in-car control unit 20B in the security system according to the third embodiment is described below. Here, since the processing operation performed by the microcomputer 21B is the same as the processing operation ① shown in FIG. 2 except for the emergency processing operation (see FIG. 3), only the emergency processing operation is described by reference to a flow chart shown in FIG. 5.

Figure 5:
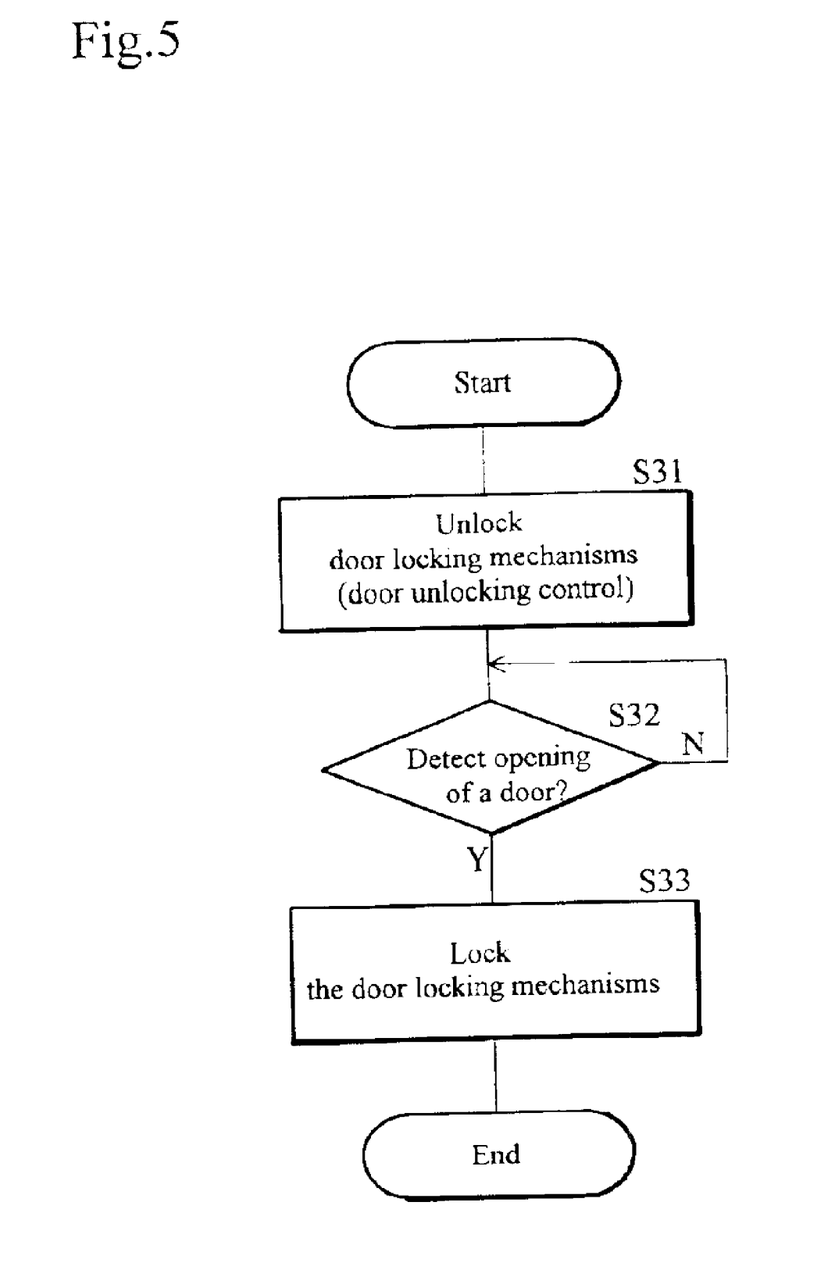
FIG. 5 is a flow chart showing a processing operation performed by a microcomputer of an in-car control unit in a security system according to a third embodiment.

The door locking actuator 25 is controlled so that locking mechanisms to at least two or more doors become in the unlocked state (Step 31), and then, whether a door is opened or not is judged based on an output signal from the door open/closed state detecting means 24 (Step 32).

When it is judged that a door is opened (the user opened the door), the door locking actuator 25 is controlled so that the locking mechanisms in the unlocked state become in the locked state (Step 33). On the other hand, when it is judged that a door is not opened, the operation returns to Step 32.

Using the security system according to the third embodiment, when an emergency command code is received in the in-car control unit 20B, the locking mechanisms to the doors of the car are controlled to be in the unlocked state. Since the user can unlock the doors beforehand by pressing the emergency SW 14c, the user can open an appropriate door and get into the car as soon as the user reaches the parking place of the car.

When the emergency command code is received, the locking mechanisms to at least two or more doors are rendered in the unlocked state. Therefore, for example, when the locking mechanisms to the driver's seat side door and the assistant driver's seat side door are rendered in the unlocked state, the user can get into the car from either the left or the right side of the car, so that the user can make an entry appropriate for the situation. When the user is near the left side of the car (a right-hand drive), the user can get into the car swiftly from the assistant driver's seat side without taking the trouble to go around to the driver's seat side.

When the locking mechanisms to two or more doors are in the unlocked state, there is a fear that a criminal may break into a vehicle or the like from another door which the user does not open. But using the security system according to the third embodiment, when the opening of a door is detected, the locking mechanisms in the unlocked state are rendered in the locked state. Therefore, the closed doors (the other doors the user does not open) are locked, while the door the user once opened is automatically locked as it is closed. This is because the door locking mechanism is a self-locking mechanism.

Accordingly, even when the user loses a cool judgment and is upset in a situation where the user is being chased by a criminal, it is possible to avoid the occurrence of a hazardous condition where a door is opened by the criminal, if the user can only enter the vehicle or the like and close the door.

In the security system according to the third embodiment, when the user presses the emergency SW 14c, the locking mechanisms to at least two or more doors are unlocked. But in a security system according to another embodiment, only one door may be unlocked. In this case, since the locks to the doors except the door concerned (e.g. the driver's seat side door) are not unlocked, it is possible to avoid the occurrence of a perilous condition where a criminal breaks into the car, for example, from any of the doors except the driver's seat side door (such as the assistant driver's seat side door).

A security system according to a fourth embodiment is described below. Here, since the construction of the security system according to the fourth embodiment is the same as that of the security system shown in FIG. 1 except for the microcomputer, a microcomputer and an in-car control unit having the microcomputer, to which other marks are affixed, are described, while the other components are not described.

In the figure, reference numeral 20C represents an in-car control unit, which comprises a microcomputer 21C, a receiving circuit 22, an antenna 23, a door open/closed state detecting means 24 to detect the open or closed state of doors, and a door locking actuator 25 to make door locking mechanisms be in the unlocked or locked state.

The processing operation performed by the microcomputer 21C of the in-car control unit 20C in the security system according to the fourth embodiment is described below. Here, since the processing operation performed by the microcomputer 21C is the same as the processing operation ① shown in FIG. 2 except for the emergency processing operation (see FIG. 3), only the emergency processing operation is described by reference to a flow chart shown in FIG. 6.

Figure 6:
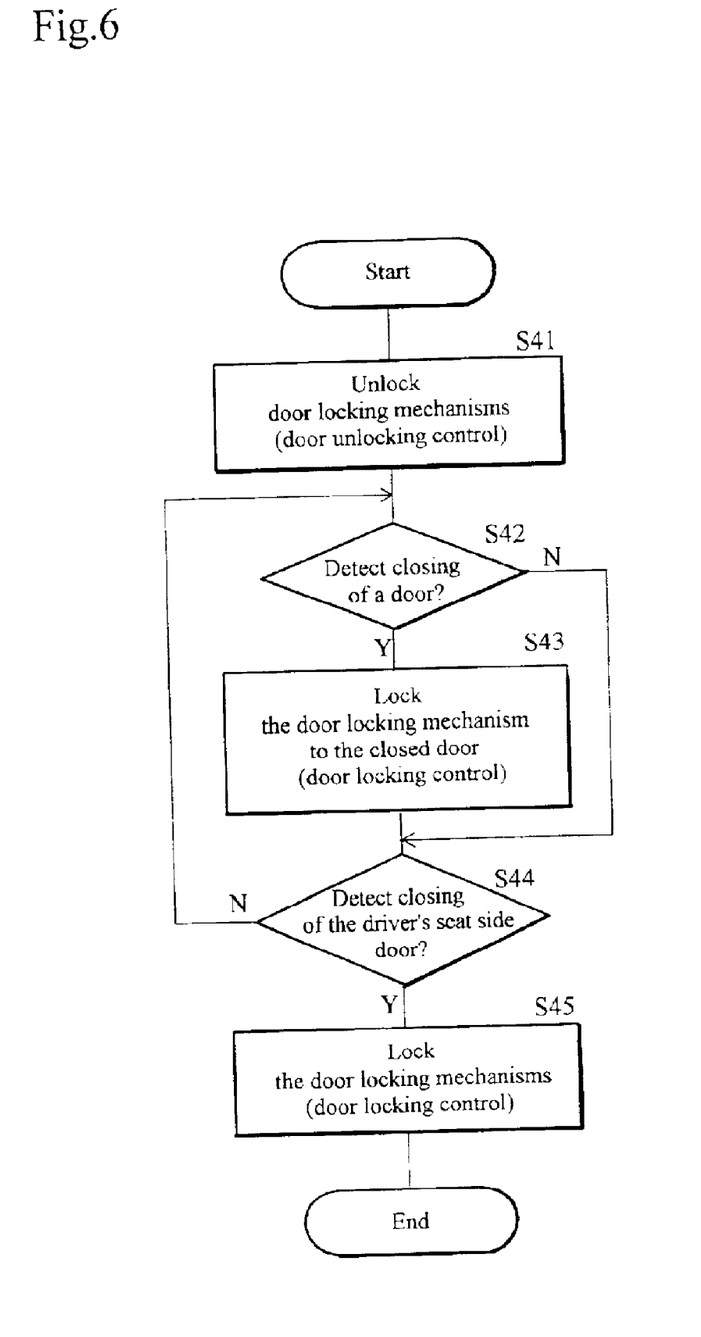
FIG. 6 is a flow chart showing a processing operation performed by a microcomputer of an in-car control unit in a security system according to a fourth embodiment.

The door locking actuator 25 is controlled so that locking mechanisms to at least two or more doors become in the unlocked state (Step 41), and then, whether a door was opened and the opened door (the door opened by the user or the user's companion) is closed or not is judged based on an output signal from the door open/closed state detecting means 24 (Step 42).

When it is judged that the door is closed (the user or the user's companion got into the car and closed the door), the door locking actuator 25 is controlled so that the locking mechanism to the door concerned becomes in the locked state (Step 43). On the other hand, when it is judged that the door is not closed, the operation bypasses Step 43 and proceeds to Step 44.

In Step 44, whether the driver's seat side door was opened and is closed or not is judged, and when it is judged that the driver's seat side door is closed, the door locking actuator 25 is controlled so that the door locking mechanisms in the unlocked state become in the locked state (Step 45). On the other hand, when it is judged that the driver's seat side door is not closed, the operation returns to Step 42.

Using the security system according to the fourth embodiment, when an emergency command code is received in the in-car control unit 20C, the locking mechanisms to the doors of the car are rendered in the unlocked state. Since the user can unlock the doors of the car beforehand by pressing the emergency SW 14c, the user can open a door and get into the car as soon as the user reaches the parking place of the car.

Using any of the security systems according to the first to third embodiments, when one door is opened and then closed, all of the doors are locked, or when one door is opened, the other doors are locked. Therefore, it is possible to prevent anyone but the user (e.g. a criminal) from entering the vehicle or the like.

However, when it is not the user alone but two or more persons together who try to run away from a criminal and each of them tries to get into a vehicle or the like from a separate door, the door which he/she tries to open might have been already locked, because one's opening or closing of his/her door is not timed to the others'. In this case, there is a fear that he/she cannot open the door to enter the vehicle or the like.

Using the security system according to the fourth embodiment, when the closing of a door is detected, only the locking mechanism to the door the closing of which is detected is rendered in the locked state. When the user or a person running away with the user closes a door, only the door is locked. Therefore, even if not one person alone but two or more persons try to run away together from a criminal, each person can swiftly open a door, respectively, and enter the vehicle or the like.

When the opening and closing can be performed on all of the unlocked doors, all of the doors are locked, resulting in no particular problem. But, even if the opening and closing cannot be performed on only one of the unlocked doors, there is a fear that a criminal may break into the vehicle or the like from the door, since the door is kept unlocked.

However, using the security system according to the fourth embodiment, when the closing of a prescribed door (here, the driver's seat side door) is detected, the door locking mechanisms to the doors in the closed state are rendered in the locked state. Therefore, without performing the opening and closing on all of the unlocked doors, all of the doors can be locked, so that it is possible to avoid the occurrence of the above trouble.

A security system according to a fifth embodiment is described below. Here, since the construction of the security system according to the fifth embodiment is the same as that of the security system shown in FIG. 1 except for the microcomputer, a microcomputer and an in-car control unit having the microcomputer, to which other marks are affixed, are described, while the other components are not described.

In the figure, reference numeral 20D represents an in-car control unit, which comprises a microcomputer 21D, a receiving circuit 22, an antenna 23, a door open/closed state detecting means 24 to detect the open or closed state of doors, and a door locking actuator 25 to make door locking mechanisms be in the unlocked or locked state. Here, the door locking mechanisms are self-locking mechanisms whereby a door is automatically locked as it is closed with an interior door lock button pushed down (with the door locking mechanism kept in the locked state).

The processing operation performed by the microcomputer 21D of the in-car control unit 20D in the security system according to the fifth embodiment is described below. Here, since the processing operation performed by the microcomputer 21D is the same as the processing operation ① shown in FIG. 2 except for the emergency processing operation (see FIG. 3), only the emergency processing operation is described by reference to a flow chart shown in FIG. 7.

Figure 7:
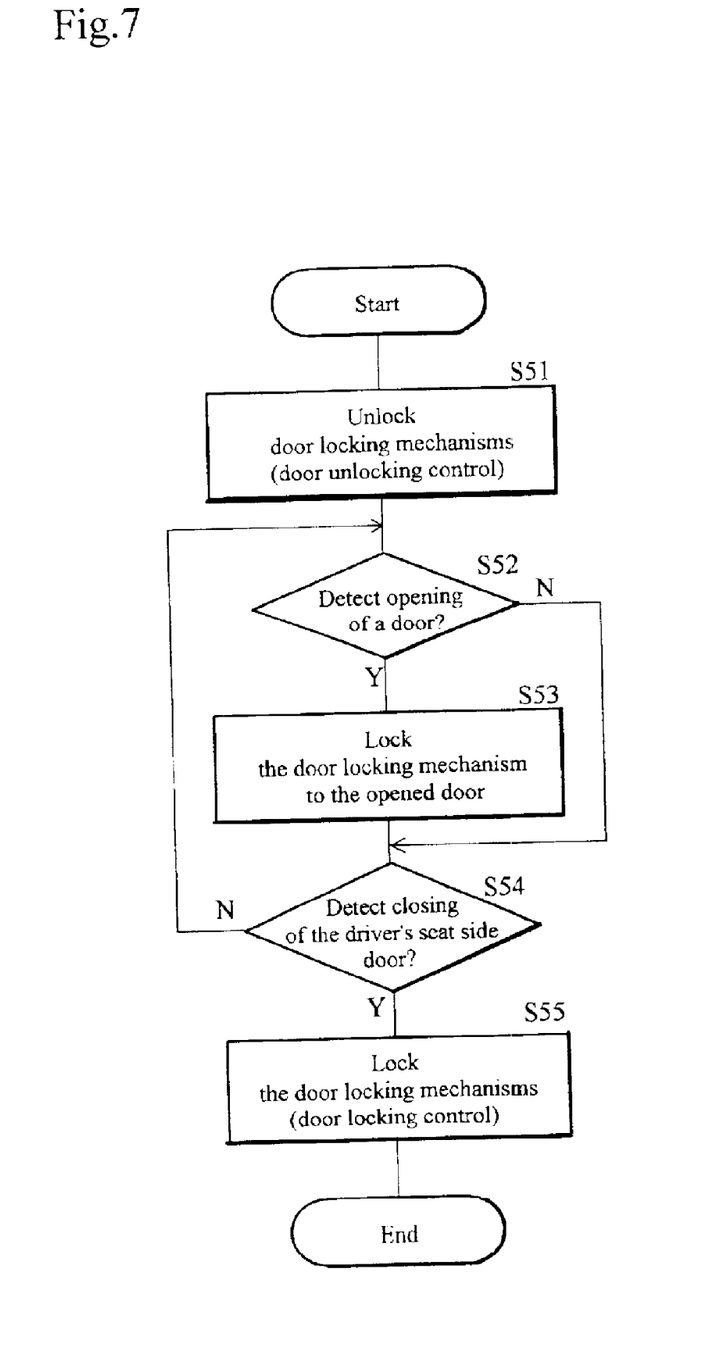
FIG. 7 is a flow chart showing a processing operation performed by a microcomputer of an in-car control unit in a security system according to a fifth embodiment.

The door locking actuator 25 is controlled so that locking mechanisms to at least two or more doors become in the unlocked state (Step 51), and then, whether a door is opened or not is judged based on an output signal from the door open/closed state detecting means 24 (Step 52).

When it is judged that a door is opened (the user or the user's companion opened the door), the door locking actuator 25 is controlled so that the locking mechanism to the door concerned becomes in the locked state (Step 53). On the other hand, when it is judged that a door is not opened, the operation bypasses Step 53 and proceeds to Step 54.

In Step 54, whether the driver's seat side door is closed or not is judged (Step 54), and when it is judged that the driver's seat side door is closed, the door locking actuator 25 is controlled so that the door locking mechanisms in the unlocked state become in the locked state (Step 55). On the other hand, when it is judged that the driver's seat side door is not closed, the operation returns to Step 52.

Using the security system according to the fifth embodiment, when an emergency command code is received in the in-car control unit 20D, the locking mechanisms to the doors of the car are controlled to be in the unlocked state. Since the user can unlock the doors of the car beforehand by pressing the emergency SW 14*c*, the user can open a door and get into the car as soon as the user reaches the parking place of the car.

Using any of the security systems according to the first to third embodiments, when one door is opened and closed, all of the doors are locked, or when one door is opened, the other doors are locked. Therefore, it is possible to prevent anyone but the user (e.g. a criminal) from entering the vehicle or the like.

However, when it is not the user alone but two or more persons together who try to run away from a criminal and each of them tries to get into the vehicle or the like from a separate door, the door which he/she tries to open might have been already locked, because one's opening or closing of his/her door is not timed to the others'. In this case, there is a fear that he/she cannot open the door to enter the vehicle or the like.

Using the security system according to the fifth embodiment, when the opening of a door is detected, only the locking mechanism to the opened door is rendered in the locked state. Therefore, the door opened by the user or a person running away with the user is automatically locked as it is closed. This is because the door locking mechanism is a self-locking mechanism whereby a door is automatically locked as it is closed with an interior door lock button pushed down (with the locking mechanism kept in the locked state).

Since the doors which are not opened can be freely opened, even if not one person alone but two or more persons try to run away together from a criminal, each person can swiftly open a door, respectively, and enter the vehicle or the like.

When the opening and closing can be performed on all of the unlocked doors, all of the doors are locked, resulting in no particular problem. However, even if the opening and closing cannot be performed on only one of the unlocked doors, there is a fear that a criminal may break into the vehicle or the like from the door, since the door is kept unlocked.

However, using the security system according to the fifth embodiment, when the closing of a prescribed door (e.g. the driver's seat side door) is detected, the door locking mechanisms to the doors in the closed state are rendered in the locked state. Therefore, without performing the opening and closing on all of the unlocked doors, all of the doors can be locked, so that it is possible to avoid the occurrence of the above trouble.

In any of the security systems according to the first to fifth embodiments, when the in-car control unit 20 (20A–20D) receives an emergency command code from the portable transmitter 10, the microcomputer 21 (21A–21D) performs an emergency processing operation. But in a security system according to another embodiment, a hidden button or the like may be arranged in a car so that an emergency signal is output when the hidden button is pressed, and a capturing means to capture the emergency signal is connected to the microcomputer 21 (21A–21D). When the capturing means captures the emergency signal, the microcomputer 21 (21A–21D) performs an emergency processing operation.

Furthermore, in the security system according to another embodiment, a fingerprint identification system may be mounted on the hidden button itself or in the periphery thereof in order to judge whether the hidden button was pressed by the authorized user or not.

In the security systems according to the first to fifth embodiments, the security systems introduced into a car are described, but the security systems according to the first to fifth embodiments can be also introduced into vehicles other than a car, or buildings such as a house.

Figure 8:
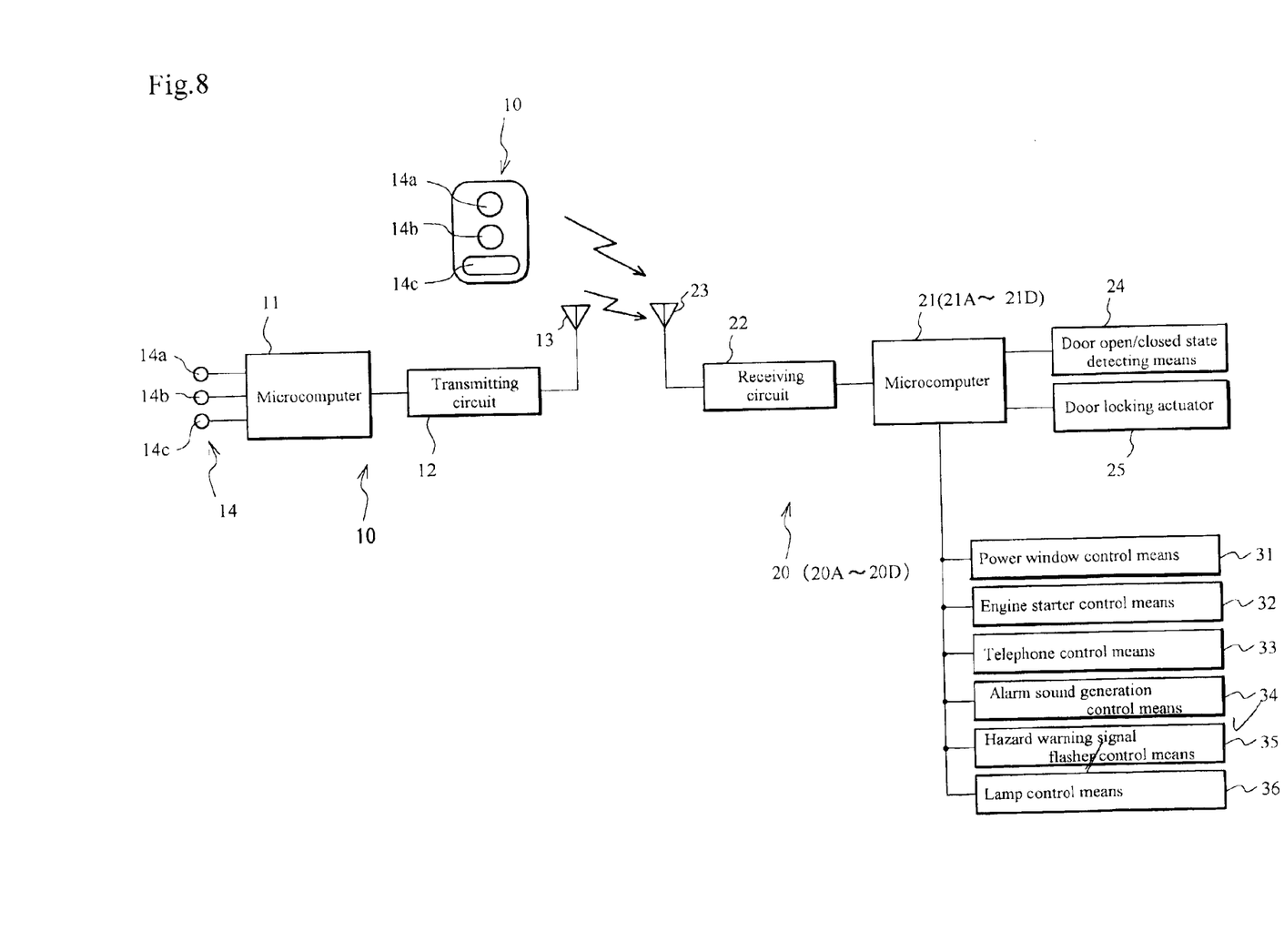
FIG. 8 is a block diagram schematically showing the principal part of a security system according to another embodiment.

Moreover, in the security systems according to the first to fifth embodiments, as shown in FIG. 8, the microcomputer 21 (21A–21D) may be connected to a power window control means 31, an engine starter control means 32, a telephone control means 33, an alarm sound generation control means 34, a hazard warning signal flasher control means 35, and a lamp control means 36. When the in-car control unit 20 (20A–20D) receives an emergency command code, prescribed signals may be transmitted to these control means 31–36 not only to lock/unlock doors but also to actuate one function among the functions of closing of windows, starting of an engine, calling to an emergency organization such as the police, alarm sound generation using a horn or the like, flashing of a hazard warning signal flasher, lighting/flashing of lamps (head lamps, tail lamps, front fog lamps, rear fog lamps, dome lamps, map lamps, etc.), and the like, or selectively actuate some of these functions in combination.

In a security system according to still another embodiment, with the timing set to the opening/closing of a door, not to the receiving of an emergency command code or to the capturing of an emergency signal, the above functions may be actuated.

What is claimed is:

1. A security system, which is introduced into a vehicle or a building having one or more doors, comprising:
   a receiver operable to receive a prescribed remote control signal and/or a capturing mechanism operable to capture an emergency signal;
   an unlocking controller operable to make a locking mechanism or locking mechanisms to the one or more doors be in the unlocked state, when the receiver receives the prescribed remote control signal or the capturing mechanism captures the emergency signal;
   a closing detector operable to detect the closing of one of the one or more doors; and
   a locking controller operable to automatically make the unlocked locking mechanism or mechanisms be in the locked state, when the one of the one or more doors is opened after the one or more doors are unlocked by the unlocking controller with a capture of the emergency signal, and then the closing of the opened door is detected by the closing detector.

2. A security system, which is introduced into a vehicle or a building having at least two or more doors, comprising:
   a receiver operable to receive a prescribed remote control signal and/or a capturing mechanism operable to capture an emergency signal;
   an unlocking controller operable to make locking mechanisms to the at least two or more doors be in the unlocked state, when the receiver receives the prescribed remote control signal or the capturing mechanism captures the emergency signal;
   an opening detector operable to detect the opening of one of the at least two or more doors; and
   a first locking controller operable to make the locking mechanisms to the closed doors be in the locked state, when the opening of the one of the one or more doors is detected by the opening detector after the at least two or more doors are unlocked by the unlocking controller with a capture of the emergency signal.

3. A security system according to claim 2, comprising:

a closing detector operable to detect the closing of the one of the at least two or more doors; and a second locking controller operable to automatically make the locking mechanism to the one of the at least two or more doors, the closing of which is detected, be in the locked state, when the one of the at least two or more doors is opened after the at least two or more doors are unlocked by the unlocking controller with a capture of the emergency signal, and then the closing of the opened door is detected by the closing detector.

4. A security system, which is introduced into a vehicle or a building having one or more doors, comprising:

a receiver operable to receive a prescribed remote control signal and/or a capturing mechanism operable to capture an emergency signal;

an unlocking controller operable to make a locking mechanism or locking mechanisms to the one or more doors be in the unlocked state, when the receiver receives the prescribed remote control signal or the capturing mechanism captures the emergency signal;

an opening detector operable to detect the opening of one of the one or more doors; and a locking controller operable to make the unlocked locking mechanism or mechanisms be in the locked state, when the opening of the one of the one or more doors is detected by the opening detector after the one or more doors are unlocked by the unlocking controller with a capture of the emergency signal;

wherein the locking mechanism or mechanisms are self-locking mechanisms.

5. A security system, which is introduced into a vehicle or a building having at least two or more doors, comprising:

a receiver operable to receive a prescribed remote control signal and/or a capturing mechanism operable to capture an emergency signal;

an unlocking controller operable to make a locking mechanism to a prescribed door be in the unlocked state, when the receiver receives the prescribed remote control signal or the capturing mechanism captures the emergency signal;

a closing detector operable to detect the closing of the prescribed door; and a locking controller operable to automatically make the locking mechanism to the prescribed door be in the locked state, when the prescribed door is opened after being unlocked by the unlocking controller with a capture of the emergency signal, and then the closing of the opened prescribed door is detected by the closing detector.

6. A security system, which is introduced into a vehicle or a building having at least two or more doors, comprising:

a receiver operable to receive a prescribed remote control signal and/or a capturing mechanism operable to capture an emergency signal;

an unlocking controller operable to make a locking mechanism to a prescribed door be in the unlocked state, when the receiver receives the prescribed remote control signal or the capturing mechanism captures the emergency signal;

an opening detector operable to detect the opening of the prescribed door; and a locking controller operable to make the locking mechanism to the prescribed door be in the locked state, when the opening of the prescribed door is detected by the opening detector after the prescribed door is unlocked by the unlocking controller with a capture of the emergency signal;

wherein the locking mechanism to the prescribed door is a self-locking mechanism.

7. A security system, which is introduced into a vehicle or a building having at least two or more doors, comprising;

a receiver operable to receive a prescribed remote control signal and/or a capturing mechanism operable to capture an emergency signal;

an unlocking controller operable to make locking mechanisms to the at least two or more doors be in the unlocked state, when the receiver receives the prescribed remote control signal or the capturing mechanism captures the emergency signal;

a first closing detector operable to detect the closing of one of the at least two or more doors; and a first locking controller operable to automatically make the locking mechanism to the one of the at least two or more doors, the closing of which is detected, be in the locked state, when the one of the at least two or more doors is opened after the at least two or more doors are unlocked by the unlocking controller with a capture of the emergency signal, and then the closing of the opened door is detected by the first closing detector.

8. A security system, which is introduced into a vehicle or a building having at least two or more doors, comprising:

a receiver operable to receive a prescribed remote control signal and/or a capturing mechanism operable to capture an emergency signal;

an unlocking controller operable to make locking mechanisms to the at least two or more doors be in the unlocked state, when the receiver receives the prescribed remote control signal or the capturing mechanism captures the emergency signal;

an opening detector operable to detect the opening of one of the at least two or more doors; and a first locking controller operable to make the locking mechanism to the one of the at least two or more doors, the opening of which is detected, be in the locked state, when the opening of the one of the at least two or more doors is detected by the opening detector after the at least two or more doors are unlocked by the unlocking controller with a capture of the emergency signal;

wherein the locking mechanisms are self-locking mechanisms.

9. A security system according to claim 7, comprising:

a second closing detector operable to detect the closing of a prescribed one of the at least two or more doors; and a second locking controller operable to automatically make the locking mechanisms to the closed doors be in the locked state, when the prescribed one of the at least two or more doors is opened after the at least two or more doors are unlocked by the unlocking controller with a capture of the emergency signal, and then the closing of the opened prescribed door is detected by the second closing detector.

10. A security system according to claim 8, comprising:

a closing detector operable to detect the closing of a prescribed one of the at least two or more doors; and a second locking controller operable to automatically make the locking mechanisms to the closed doors be in the locked state, when the prescribed one of the at least two or more doors is opened after the at least two or more doors are unlocked by the unlocking controller with a capture of the emergency signal, and then the closing of the opened prescribed door is detected by the closing detector.

11. A security system, which is introduced into a vehicle or a building having one or more doors, comprising:
- a closing detector operable to detect the closing of one of the one or more doors;
- a receiver operable to receive a prescribed remote control signal and/or a capturing mechanism operable to capture an emergency signal; and
- a locking controller operable to automatically make an unlocked locking mechanism or unlocked locking mechanisms be in the locked state, when the closing of the one of the one or more doors is detected by the closing detector after the capturing mechanism captures the emergency signal.

12. A security system according to claim 1, which is introduced into a car, comprising:
- an actuation controller operable to actuate prescribed functions when the receiver receives the prescribed remote control signal or the capturing mechanism captures the emergency signal;
- wherein the prescribed functions include at least one among a window closing function, an engine starting function, a call function to an emergency organization, an alarm sound generating function, a hazard warning signal flasher flashing function, and a lighting/flashing function of prescribed lamps.

13. A security system, which is introduced into a car, comprising:
- a receiver operable to receive a prescribed remote control signal and/or a capturing mechanism operable to capture an emergency signal;
- an unlocking controller operable to make a locking mechanism or locking mechanisms to one or more doors be in the unlocked state, when the receiver receives the prescribed remote control signal or the capturing mechanism captures the emergency signal;
- a closing detector operable to detect the closing of one of the one or more doors; and
- an actuation controller operable to actuate prescribed functions, when the one of the one or more doors is opened after the one or more doors are unlocked by the unlocking controller with a capture of the emergency signal, and then the closing of the opened door is detected by the closing detector;
- wherein the prescribed functions include at least one among a door lock locking function to automatically make locking mechanisms to the one or more doors be in the locked state, a window closing function, an engine starting function, a call function to an emergency organization, an alarm sound generating function, a hazard warning signal flasher flashing function, and a lighting/flashing function of prescribed lamps.

14. A security system according to claim 12, wherein the prescribed lamps include at least one among a head lamp, a tail lamp, a front fog lamp, a rear fog lamp, a dome lamp, and a map lamp.

15. A security system according to claim 13, wherein the prescribed lamps include at least one among a head lamp, a tail lamp, a front fog lamp, a rear fog lamp, a dome lamp, and a map lamp.

* * * * *